United States Patent
Amils et al.

(10) Patent No.: US 8,393,297 B2
(45) Date of Patent: Mar. 12, 2013

(54) AQUACULTURE NET WITH STEEL WIRES COATED WITH METAL STRIP

(75) Inventors: Xavier Amils, Zwevegem (BE); Christoph Mattheeuws, Helkijn (BE); Steven Wostyn, Desselgem (BE)

(73) Assignee: NV Bekaert SA, Zwevegem (BE)

( * ) Notice: Subject to any disclaimer, the term of this patent is extended or adjusted under 35 U.S.C. 154(b) by 196 days.

(21) Appl. No.: 12/812,537

(22) PCT Filed: Dec. 15, 2008

(86) PCT No.: PCT/EP2008/067553
§ 371 (c)(1), (2), (4) Date: Jul. 12, 2010

(87) PCT Pub. No.: WO2009/095135
PCT Pub. Date: Aug. 6, 2009

(65) Prior Publication Data
US 2010/0294201 A1      Nov. 25, 2010

(30) Foreign Application Priority Data
Jan. 30, 2008   (EP) ..................................... 08101078

(51) Int. Cl.
*A01K 63/02*   (2006.01)

(52) U.S. Cl. ........................................ 119/201; 119/203
(58) Field of Classification Search .................. 119/201, 119/203
See application file for complete search history.

(56) References Cited

U.S. PATENT DOCUMENTS

| | | | | |
|---|---|---|---|---|
| 1,703,940 | A | * | 3/1929 | Kollmar ........................ 428/672 |
| 3,453,725 | A | * | 7/1969 | Donelan et al. ................. 29/599 |
| 4,595,600 | A | * | 6/1986 | Keeven et al. ..................... 427/5 |
| 6,386,146 | B1 | * | 5/2002 | Knott, Sr. ....................... 119/223 |

FOREIGN PATENT DOCUMENTS

| | | |
|---|---|---|
| DE | 1427372 A1 | 10/1968 |
| EP | 0794026 A1 | 9/1997 |
| GB | 920468 | 3/1963 |
| JP | 2004-261023 A | 9/2004 |
| WO | WO 2007/031352 A1 | 3/2007 |

\* cited by examiner

*Primary Examiner* — Timothy D Collins
(74) *Attorney, Agent, or Firm* — Foley & Lardner LLP

(57) ABSTRACT

The invention relates to an aquaculture net (10) comprising steel wires (12) having a steel core (14) and a tuneable metal coating (16) in the form of a strip to improve anti-corrosion and anti-fouling properties. In comparison with the prior art, the metal coating can be thicker and can have a composition that is homogeneous over its thickness.

12 Claims, 2 Drawing Sheets

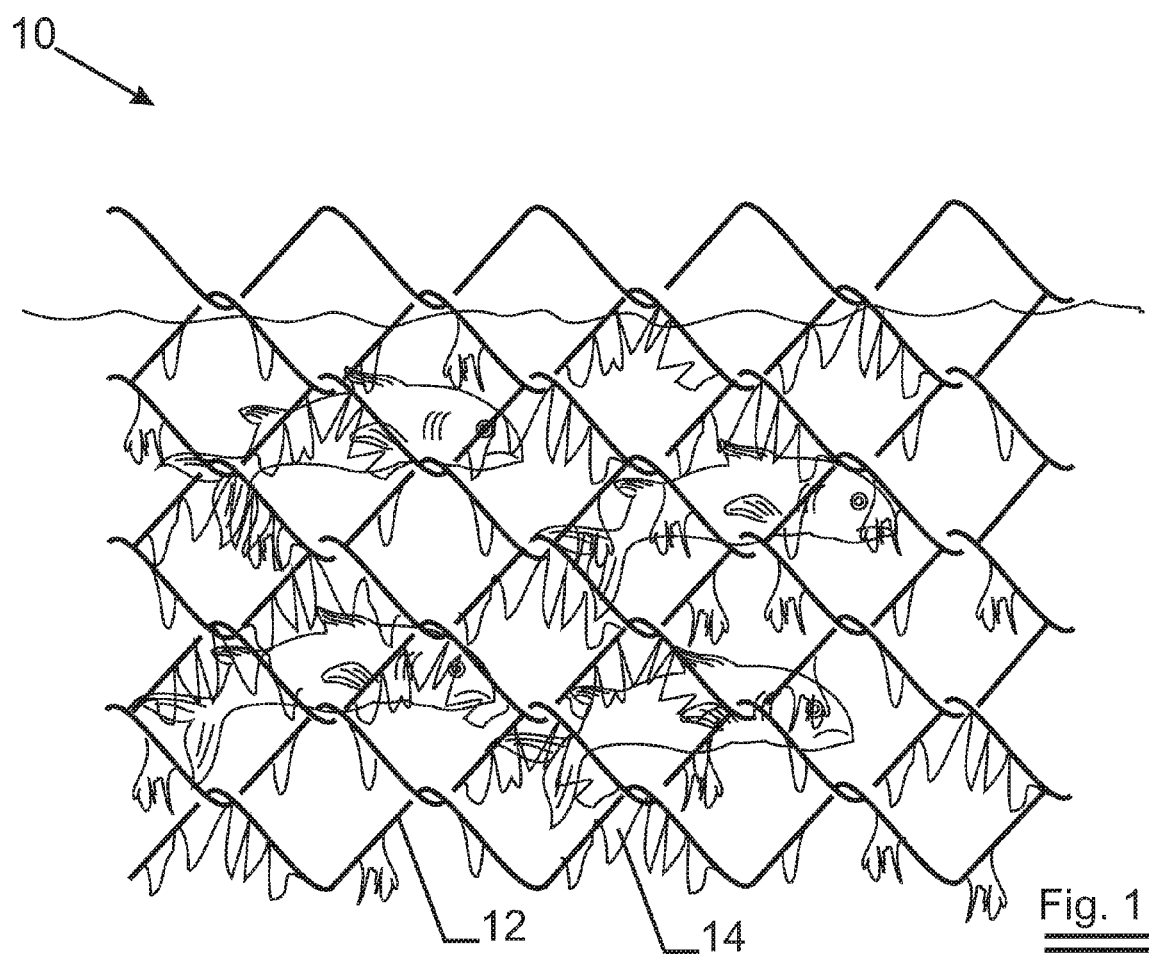
Fig. 1
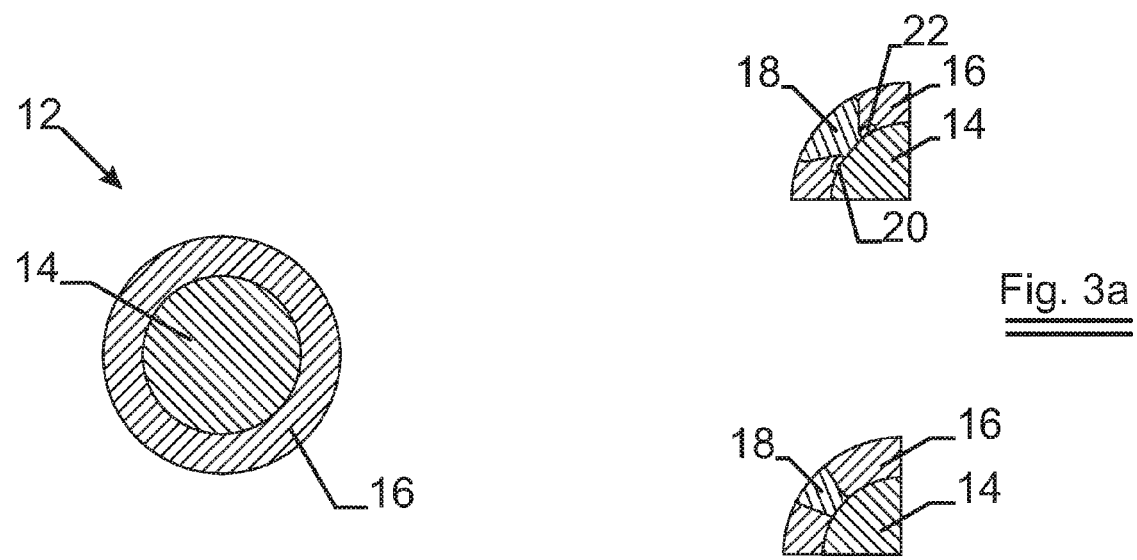
Fig. 2
Fig. 3a
Fig. 3b

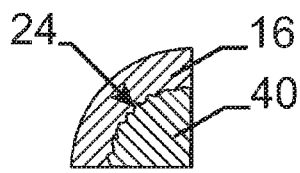 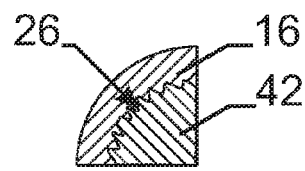
Fig. 4a                              Fig. 4b
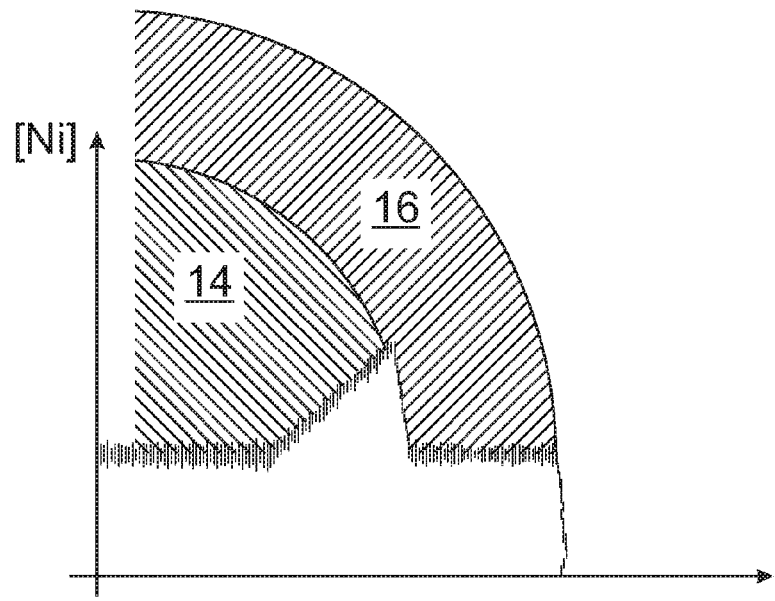
Fig. 5
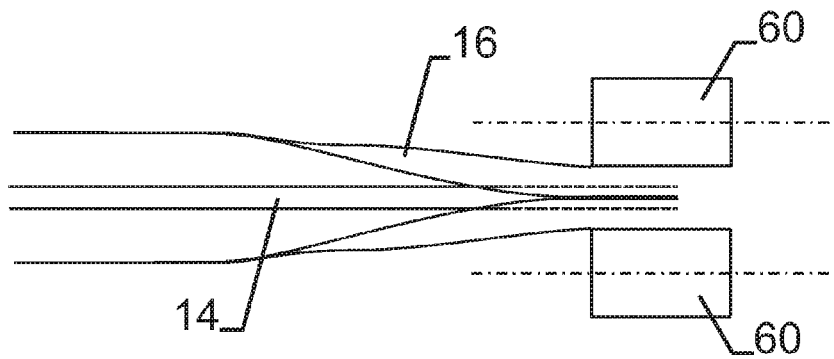
Fig. 6

AQUACULTURE NET WITH STEEL WIRES COATED WITH METAL STRIP

TECHNICAL FIELD

The invention relates to an aquaculture net with steel wires.

BACKGROUND ART

Aquaculture nets or fish-farming nets are used to raise aquatic life such as fish. The aquaculture net keeps the aquatic life controlled and contained and protects the aquatic life inside the net against predators such as sharks and sea wolfs.

The aquaculture nets are usually of the chain-link fence type. This is a fence of steel wires woven into a diamond pattern. The meshes have a dimension that is smaller than the dimension of the fish contained in the nets. Each steel wire is preformed by bending so that it exhibits a wavy pattern with maxima and minima. The maxima of a steel wire interlock with the minima of a neighbouring wire to form the patterns of a series of diamonds.

Experience has shown, however, that aquaculture nets of the chain-link fence type also have some disadvantages. Aquaculture nets have been discovered where one or more of the steel wires were broken after a limited life time.

Investigation of the failing aquaculture nets revealed that particularly the upper steel wires in the aquaculture net were broken. Indeed, the ocean or the sea forms a huge challenge with respect to corrosion-resistance. In addition to this highly corroding environment, the waves and tidings subject the aquaculture net to a continuous and repeated movement. In an aquaculture net of the chain-link fence type, each steel wire must carry the weight of the rest of the net below it. The upper wire makes point contacts with the wire just below it. These point contacts are located at a point where both the upper wire and the wire just below it are subjected to both a bending and a torsion deformation. The continuous and repeated imposed movements in this aggressive environment create fretting at the point contacts and may result in breaking the wires of the net.

Aquaculture nets with galvanized steel wires offer an acceptable resistance against bio-fouling, i.e. against fouling material that may grow on the mesh structure. Within the context of the present invention, the terms fouling material refer to fouling organisms such as barnacles, algae or molluscs, which may attach and grow to the wire material of the mesh structure. However, this fouling mechanism may be so persistent that entire openings in the meshes may be filled blocking any introduction of fresh water or nutrition into the volume inside the mesh structure.

Therefore, there is a need for aquaculture nets with better anti-fouling and anti-corrosion properties.

JP-A-2004-261023 discloses a steel wire for aquaculture nets. The steel wire has a stainless steel core and a metal coating of cupronickel: a copper nickel alloy with nickel content ranging between 10% and 30% by weight. The metal coating can be applied either by hot dipping the stainless steel core in a copper nickel bath or by plating the stainless steel core with copper, thereafter with nickel and finally applying a thermal diffusion treatment.

Copper nickel coatings have proven to provide a good resistance against corrosion because of the nickel and have proven to provide a good resistance against fouling because of the effect of copper. However, the existing prior art steel wires with copper nickel coatings lack the possibility to fine tune the thickness and the composition of the copper nickel coating because of following reasons or do not offer high quality steel wires with a thick coating.

If a hot dip copper nickel bath is used, the composition of the copper nickel coating can be varied by varying the composition of the copper nickel bath. The thickness, however, largely depends upon the wire speed of leaving the bath and upon the final degree of rolling or drawing. It is difficult, if not impossible, to obtain steel wires with a coating the thickness of which exceeds 30% of the wire diameter. Moreover, having regard to the high melting temperature of both copper and nickel in comparison with zinc, it is difficult to manufacture high-quality coated wires due to oxidation problems at the surface of the steel core.

If a thermal diffusion treatment is applied, the thickness of the copper nickel coating can be predetermined by increasing the time for (electro)-plating. It is hereby understood that the longer the plating treatment the thicker the coating and vice versa, all other parameters being constant. The composition, however, is more difficult to control. As the nickel is applied on top of the copper, nickel diffuses through the copper from the top and also from the stainless steel core since stainless steel also comprises nickel due to downstream heat treatments. This diffusion process, however, is difficult to control and to fine tune. As a result, with a thermal diffusion treatment it is impossible to obtain a coating with e.g. 90 wt % copper and 10 wt % nickel and having this same composition throughout the thickness of the coating.

The dimensions of an aquaculture net are considerable. An example of a typical dimension is 30 m×30 m×15 m, the last dimension being the depth of the net inside the water and the first two dimensions being the width and length of the net at the water surface. As a matter of example only, a net made of galvanized steel wire and of the above-mentioned dimensions has a weight above 4 metric Tonnes. An embodiment of an aquaculture net has been disclosed in W0-A1-2007/031352. As such the weight of an aquaculture net needs to be kept to a minimum. A tuneable coating guarantees thickness thus controllable weight of the wires and the net.

DISCLOSURE OF INVENTION

It is an object of the present invention to avoid the drawbacks of the prior art.

It is a further object of the present invention to provide an aquaculture net with steel wires having a tuneable coating.

It is another object of the present invention to provide an aquaculture net with steel wires having a thick coating thus offering sufficient resistance against corrosion and against fouling.

It is still another object of the present invention to provide an aquaculture net with steel wires having a coating the composition of which is homogeneous over its thickness.

Yet another object of the present invention is to provide an aquaculture net where the thickness of the coating can be controlled without giving in on production speed.

According to the present invention, there is provided an aquaculture net with steel wires. The steel wires have a steel core and a metal coating to give an anti-corrosion and anti-fouling property to the steel wires. The metal coating is in the form of a strip or a foil that is fixed around the steel core. A strip of a suitable metal of controlled composition and predetermined and desired thickness can be formed into a tube form. The width of this strip is somewhat greater or equal to the circumference of the steel core to be covered. The strip is closed in a tube and welded on or around the steel core.

Alternatively, two strips can be used to cover the steel core. Instead of welding these two strips are drawn on the steel core.

These two techniques, which are known as such, provide many advantages for the purpose of the present invention. They allow determining independently both the composition and the thickness of the metal coating around the steel core, providing anti-fouling and anti-corrosion properties. Also the steel core can be improved optimally independently from the metal coating, with regards to tensile strength. Both the steel core and the metal coating can be adapted so as to provide an optimal adhesion between the two composite materials. As such an aquaculture net can be provided having optimal anti-fouling and anti-corrosion properties, as well as being strong.

In a preferred embodiment said metal coating is a copper nickel alloy. Copper nickel coatings have proven to provide a good resistance against corrosion because of the nickel, and good resistance against fouling because of the effect of copper.

In one embodiment said metal coating is CuNixFey whereby x is 9, 10 or 11 and y is 1. In another embodiment said metal coating is CuNixSny whereby x is 8, 9, 10 or 11 and y is 1, 2 or 3. Herein x and y are weight percentages. These particular alloys have the advantage that they harden during an annealing process resulting in an increased abrasion resistance.

Other alloys are also possible, such as CuZnSn alloys and CuZnNi alloys.

In a further embodiment said copper nickel alloy comprises at least 80 percent by weight copper and between 5 percent by weight and 15 percent by weight nickel. A composition of 90 wt % Cu and 10 wt % Ni has proven to be an acceptable composition.

Preferably said steel core according to the invention is a hard pre-drawn steel wire. A hard drawn steel wire has a much higher surface hardness than a wire rod just coming from the mill. Increased hardness of the inner core wire increases the adhesion of the coating to the steel core. A hard drawn steel also increases the initial tensile strength of the uncoated steel core wire used in aquaculture nets. Further drawing the steel wire after coating increases even more the final tensile strength and improves the adhesion of the coating to the steel core. Final tensile strengths above 1500 MPa, e.g. above 1800, e.g. above 2000 MPa and more may be obtained.

In a preferred embodiment according to the invention the gaps between the steel core and the metal coating are smaller than 50 μm, e.g. smaller than 10 μm. Most preferably there are no gaps between said steel core and said metal coating. For reasons of corrosion in the salty seawater, all gaps are preferably avoided. The way how these gaps are avoided is explained hereinafter.

In another embodiment said steel core comprises nickel, said nickel presenting a gradient close to the interface between said steel core and said metal coating, improving adhesion between the two composite materials. This is further described in FIG. 5.

In yet a further preferable embodiment said steel core has a body centered cubic structure and said metal coating has a face centered cubic structure, again for improving adhesion between the two composite materials. The term "body centered cubic structure" refers to the crystallographic structure and means that a crystal has one lattice point in the center of the unit cell in addition to the eight corner points. It has a contribution of 2 lattice points per unit cell (($\frac{1}{8}$)*8+1). The term "face centered cubic structure" refers to a crystallographic structure with lattice points on the faces of the cube of which each unit cube gets exactly one half contribution, in addition to the corner lattice points, giving a total of 4 atoms per unit cell (($\frac{1}{8}$ for each corner)*8 corners+($\frac{1}{2}$ for each face)*6 faces).

In one embodiment said steel core is a low carbon steel, since a low carbon steel has a body centered cubic structure providing a good adhesion with a face centered cubic structure of a CuNi coating.

In another embodiment said steel core is a stainless steel. Some types of stainless steel have a body centered cubic structure and other types of stainless steel have a face centered cubic structure. Any way, whatever type of stainless steel core is used, in comparison with low carbon steel stainless steel provides an excellent corrosion resistance even in case sea water penetrates until the steel core.

In case the stainless steel core has a face centered cubic structure, the right level of adhesion is obtained by an adequate annealing treatment and by drawing the steel core and the coating to a high degree.

BRIEF DESCRIPTION OF FIGURES IN THE DRAWINGS

FIG. 1 shows an aquaculture net overgrown with bio-fouling material.

FIG. 2 shows a cross section of a wire according to the invention.

FIG. 3 shows an example of bad (3a) and good (3b) adhesion when welding a metal coating round a steel core.

FIG. 4 shows an example of bad (4a) and good (4b) mechanical adhesion between materials of different crystallographic structure.

FIG. 5 shows the effect of annealing at different temperatures.

FIG. 6 shows the process of welding a metal coating to a steel core.

MODE(S) FOR CARRYING OUT THE INVENTION

FIG. 1 shows an aquaculture net 10 whereby the steel wires 12 of the mesh structure are overgrown with bio-fouling organisms 14, such as barnacles, algae or molluscs that attach to the net. The fouling mechanism may be so persistent that entire openings in the meshes may be filled blocking any introduction of fresh water or nutrition into the volume inside the mesh structure.

FIG. 2 shows a cross section of a steel wire 12 according to the invention. A metal coating 16 is welded to or around a steel core 14.

A known problem with welding a metal coating to a steel core is adhesion.

Several processes and materials have been used to increase clad wire adhesion.

In the context of the present invention, the term "cladding" means the process of providing a coating around a steel core in the form of a strip or a foil and fixing this to the steel core by means of welding or by means of drawing.

FIG. 3a shows an example of bad adhesion whereby a metal coating 16 is welded to a steel core 14 by means of a welding zone 18 leaving gaps 20 and 22 in the welding zone.

FIG. 3b shows an example of good adhesion whereby gaps 20 and 22 are avoided.

In one process clad wire adhesion was increased by using Turks heads at high temperature. Turks heads were applied just after the welding table to press the coating onto the core wire at a minimum temperature of 200 degrees C. All cross sections showed perfect adhesion. After combining with drawing in one die pass, no gaps were seen at the interface, even at the welding zone. The composite could be drawn at least 10% more in diameter directly in the cladding line. Characteristic voids or gaps at the welding zone were not observed during the further drawing.

In another process adhesion is increased by choosing material with different crystallographic structure for the steel core and the metal coating. FIG. 4b shows an example of good mechanical adhesion for a steel core with a body centered cubic structure and a metal coating with a face centered cubic structure. In contrast with FIG. 4b, FIG. 4a shows a cross-section of a steel core and metal coating where both have a face centered cubic structure. The interface between the steel core and the coating has a surface area that is smaller than that of FIG. 4b, hence providing less adhesion between the two materials.

In yet another process adhesion is increased by annealing at an appropriate temperature. Tests have been performed at different temperatures. FIG. 5 shows the effect of annealing for 2 hours at 1070 degrees C. A significant enrichment in Ni is observed towards the outer surface of a stainless steel core 14. In other words, a gradient in Ni close to the interface between said steel core and said metal coating is noticed. This improves adhesion between the stainless steel core 14 and the metal coating 16.

In a fourth process adhesion is increased by increasing the hardness and improving the surface quality of the inner wire. As mentioned a hard drawn wire as starting core material yields better adhesion, compared to a rod as starting material.

Clad wire adhesion can be measured by means of indirect methods, such as by cutting the composite wire with pliers or others and observing the ends.

Another indirect method is by following up the corrosion at the cut ends in a hot sea water test. Bad adhesion has a direct impact on cut end corrosion. Yet another indirect method is by optical microscopy and cross section roughness measurements. A fourth indirect method is by SEM and EDXS to check the diffusion.

FIG. 6 shows the process of welding a metal coating 16 to a steel core 14. A strip of a suitable metal 16 and predetermined thickness can be formed into a tube form. The width of this strip is somewhat greater or equal to the circumference of the steel core 14 to be covered. The strip is closed in a tube and welded around the steel core. After welding, Turks heads 60 press the metal coating 16 to the steel core 14.

As such a process is provided wherein a metal coating of predefined composition and thickness is applied to a steel core wire. Said metal coating is a copper nickel alloy. The metal coating is welded around or on a steel wire core.

Preferably the process step of welding may be preceded by a step of drawing the steel wire in order to provide a steel wire with increased hardness and with increased tensile strength.

Preferably the process step of welding may be followed by a step of pressing the coating against the steel core by means of Turks heads at a minimum temperature of 200 degrees Celsius.

Alternatively or additionally, the process step of enclosing the steel core with a strip or foil of metal may be followed by a step of annealing the steel core with the metal coating at a temperature above 950° C. for a time period of at least one hour.

The invention claimed is:

1. An aquaculture net comprising:
   steel wires, said steel wires comprising a steel core and a tubular metal strip disposed around said steel core, the tubular metal strip being configured to provide anti-corrosion and anti-fouling protection to said steel wires,
   wherein said steel wires further comprise a welding zone at which said tubular metal strip is welded to said steel core, the steel wires being configured such that opposing longitudinal sides of said tubular metal strip are joined at the welding zone, and
   wherein said steel core comprises nickel and, in an area proximate an interface between said steel core and said metal strip, an amount of said nickel in said steel core increases as a distance from a center of said steel core increases.

2. An aquaculture net according to claim 1, wherein said strip and said steel core have been drawn.

3. An aquaculture net according to claim 1, wherein said metal strip is a copper nickel alloy.

4. An aquaculture net according to claim 3, wherein said copper nickel alloy comprises at least 80 percent by weight copper and between 5 percent by weight and 15 percent by weight nickel.

5. An aquaculture net according to claim 1, wherein said steel core is a pre-drawn steel wire.

6. An aquaculture net according to claim 1, wherein there are no gaps between the steel core and the metal strip.

7. An aquaculture net according to claim 1, wherein said steel core has a body centered cubic structure and said metal strip has a face centered cubic structure.

8. An aquaculture net according to claim 7, wherein said steel core is a stainless steel.

9. An aquaculture net according to claim 1, wherein said steel core is a low carbon steel.

10. An aquaculture net according to claim 1, wherein said steel core has a face centered cubic structure and said metal strip has a face centered cubic structure.

11. An aquaculture net according to claim 10, wherein said steel core is a stainless steel.

12. An aquaculture net comprising:
    steel wires, said steel wires comprising a steel core and a metal strip disposed around said steel core, the metal strip being configured to provide anti-corrosion and anti-fouling protection to said steel wires,
    wherein said steel wires further comprise a welding zone at which said metal strip is welded to said steel core, and
    wherein said steel core comprises nickel and, in an area proximate an interface between said steel core and said metal strip, an amount of said nickel in said steel core increases as a distance from a center of said steel core increases.

* * * * *